US009544762B2

(12) United States Patent
Zeng et al.

(10) Patent No.: US 9,544,762 B2
(45) Date of Patent: Jan. 10, 2017

(54) METHOD AND SYSTEM FOR CONFIGURING A DEVICE FOR USE OVER A COMMUNICATION NETWORK

(71) Applicant: Verizon Patent and Licensing Inc., Basking Ridge, NJ (US)

(72) Inventors: Guang Zeng, Lexington, MA (US); Nabil N. Bitar, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/638,665

(22) Filed: Mar. 4, 2015

(65) Prior Publication Data
US 2016/0262014 A1 Sep. 8, 2016

(51) Int. Cl.
H04M 3/00 (2006.01)
H04W 8/26 (2009.01)
H04W 60/00 (2009.01)
H04W 76/02 (2009.01)

(52) U.S. Cl.
CPC ............ *H04W 8/265* (2013.01); *H04W 60/00* (2013.01); *H04W 76/02* (2013.01)

(58) Field of Classification Search
CPC ....... H04W 8/265; H04W 60/00; H04W 76/02

USPC ........................................................ 455/418
See application file for complete search history.

(56) References Cited

U.S. PATENT DOCUMENTS

| 7,420,465 B2 * | 9/2008 | Ritter | G06Q 20/32 340/539.32 |
| 8,806,567 B1 * | 8/2014 | Venable, Sr. | H04L 63/0823 340/8.1 |
| 2007/0194940 A1 * | 8/2007 | Valluru | G08B 21/02 340/573.4 |

* cited by examiner

*Primary Examiner* — Amancio Gonzalez

(57) ABSTRACT

An approach and system for readying the device for use over a communication network is described. The system processes label information associated with a device unregistered for use by a user over a communication network of a service provider to determine a pairing identifier assigned by the service provider to a transmitter associated with the device. The system also determines a pairing connection is established between the device and the transmitter based on the pairing identifier. The system also determines the transmission of location information associated with the device, the transmitter, or a combination thereof over the pairing connection, over a high speed communication channel established with the service provider, or a combination thereof. The system further initiates a registration procedure of the device with the communication network based on the location information, registration information associated with the device, the transmitter, the user, or a combination thereof, or a combination thereof.

20 Claims, 12 Drawing Sheets

100

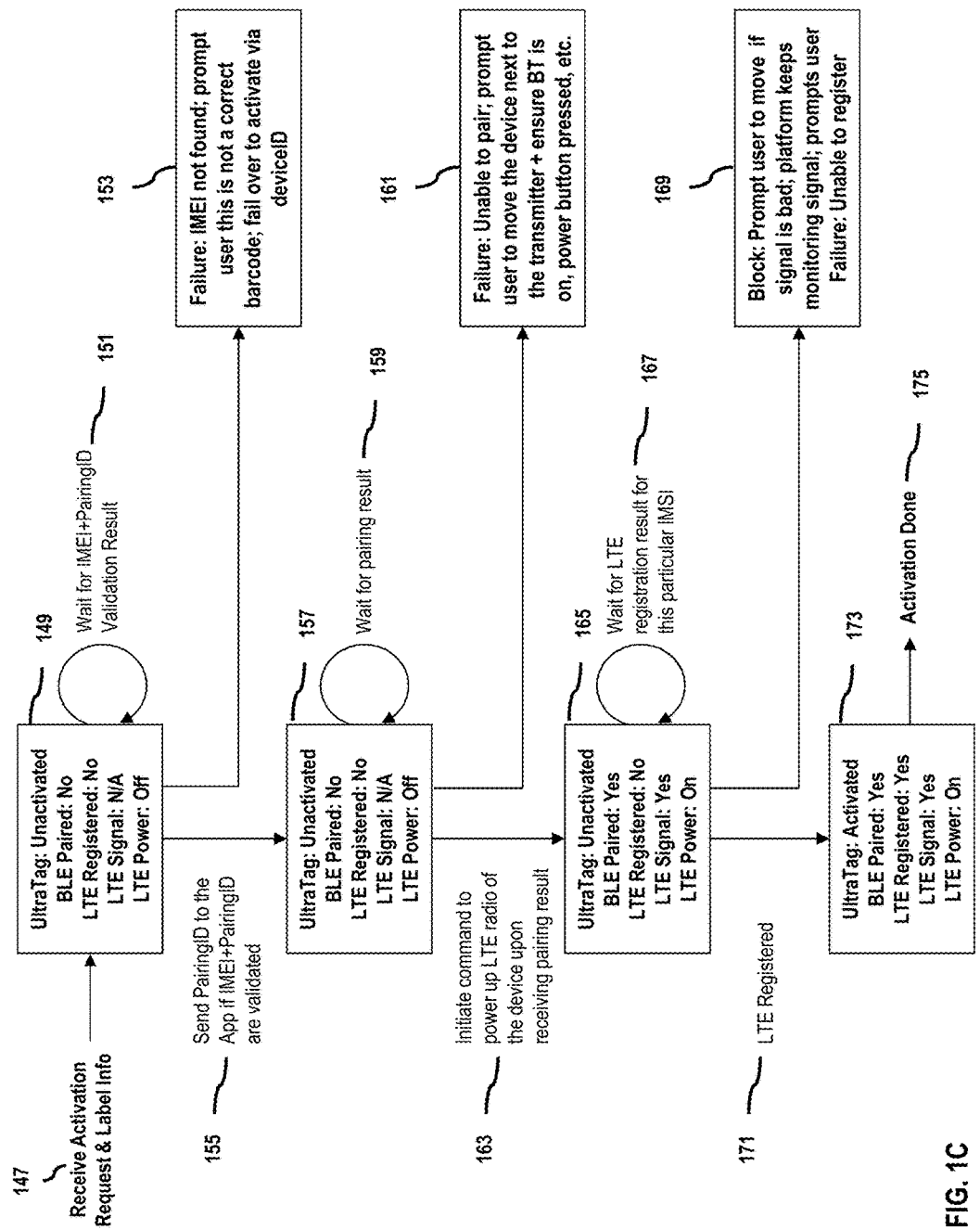

300

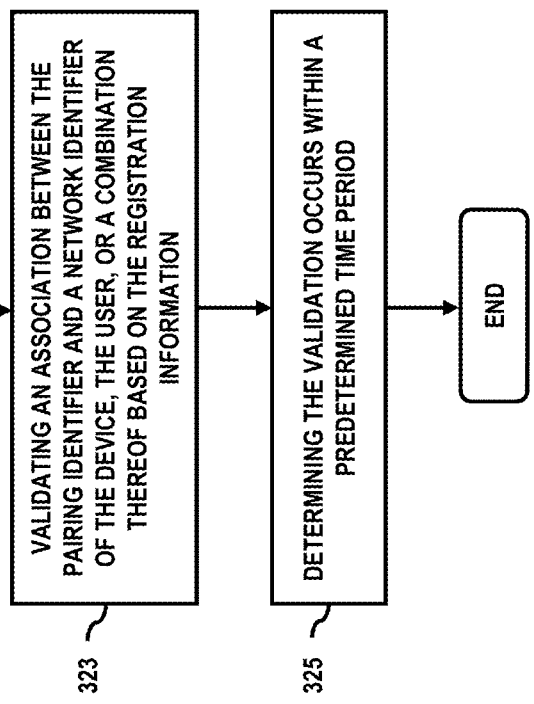

FIG. 3C
322

323 — VALIDATING AN ASSOCIATION BETWEEN THE PAIRING IDENTIFIER AND A NETWORK IDENTIFIER OF THE DEVICE, THE USER, OR A COMBINATION THEREOF BASED ON THE REGISTRATION INFORMATION

325 — DETERMINING THE VALIDATION OCCURS WITHIN A PREDETERMINED TIME PERIOD

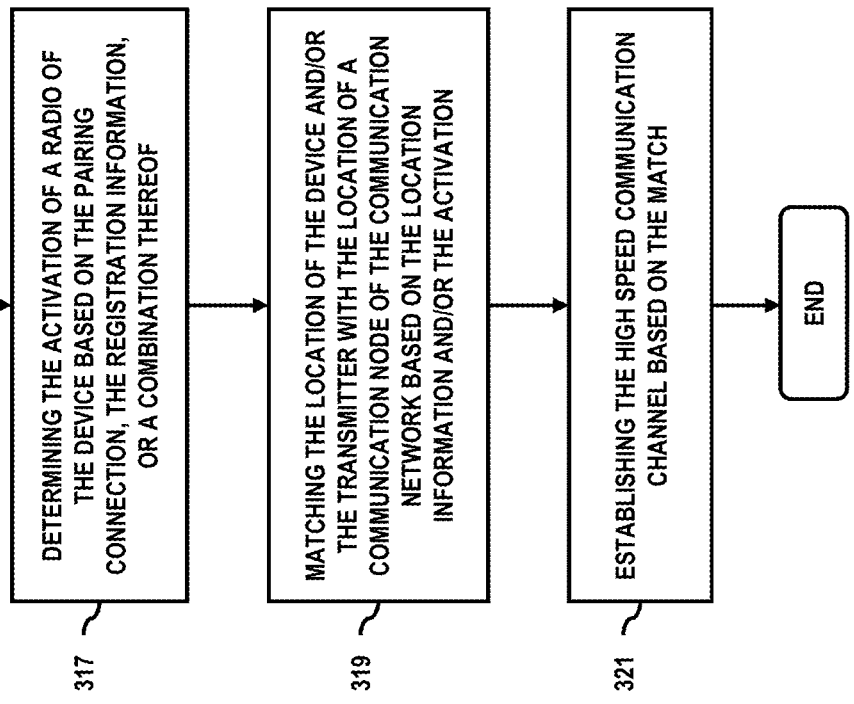

FIG. 3B
316

317 — DETERMINING THE ACTIVATION OF A RADIO OF THE DEVICE BASED ON THE PAIRING CONNECTION, THE REGISTRATION INFORMATION, OR A COMBINATION THEREOF

319 — MATCHING THE LOCATION OF THE DEVICE AND/OR THE TRANSMITTER WITH THE LOCATION OF A COMMUNICATION NODE OF THE COMMUNICATION NETWORK BASED ON THE LOCATION INFORMATION AND/OR THE ACTIVATION

321 — ESTABLISHING THE HIGH SPEED COMMUNICATION CHANNEL BASED ON THE MATCH

326

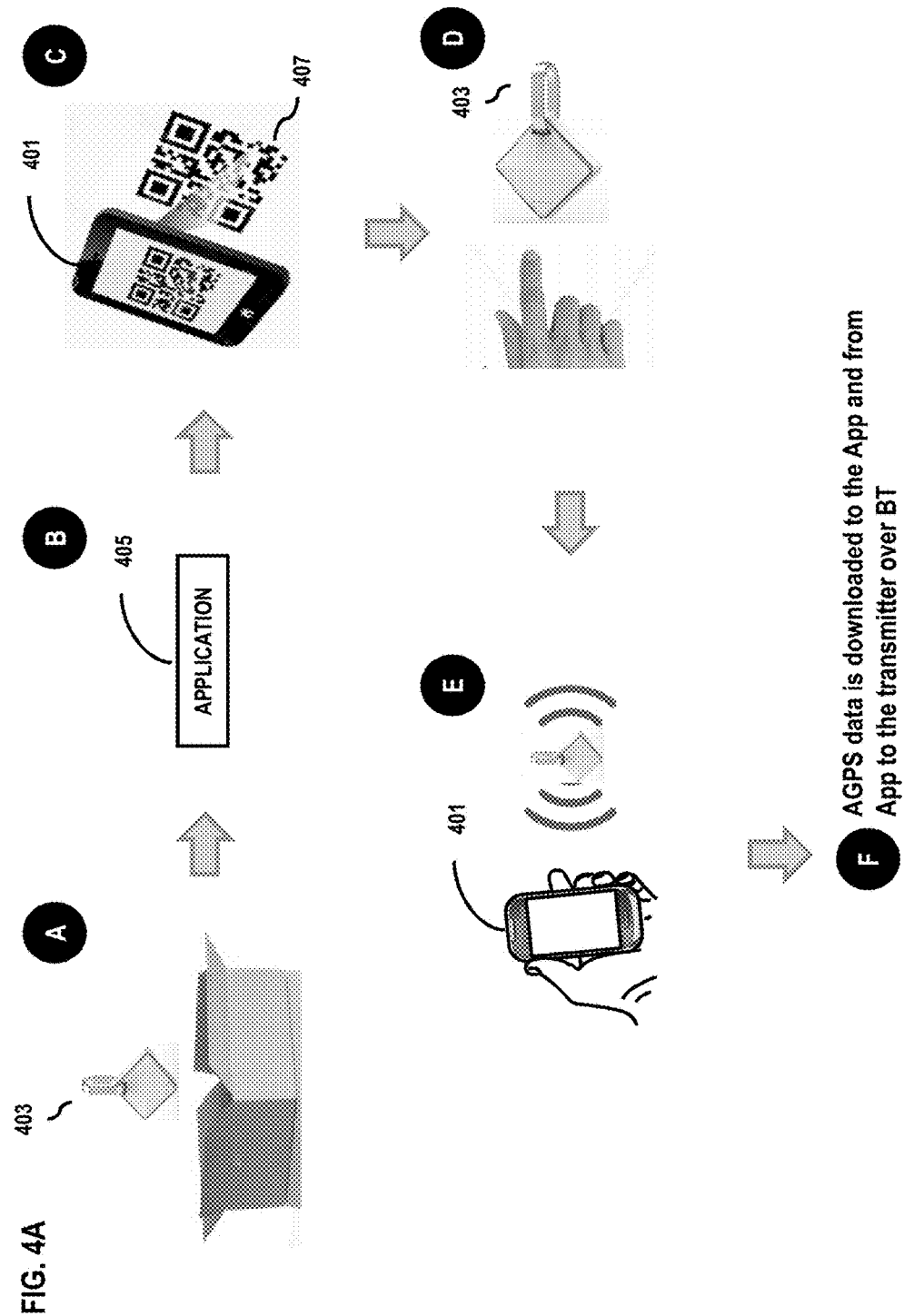

600

US 9,544,762 B2

METHOD AND SYSTEM FOR CONFIGURING A DEVICE FOR USE OVER A COMMUNICATION NETWORK

BACKGROUND INFORMATION

Service providers are continually challenged to deliver value and convenience to consumers by providing compelling network services and advancing the underlying technologies. One area of interest has been enhancing the out-of-box experience of mobile device users, and particularly, the ability of users to ready a device for use over a communication network. For example, a device must be registered and properly provisioned with the communication network in order for the user to enjoy any network features of the device. Typically, the device and network configuration process involves the user to call/message or visit the provider of the communication network to receive assistance or to have various device configuration steps performed. Alternatively, the device may be readied by way of over-the-air (OTA) techniques in conjunction with reading of the subscriber identity module (SIM) card of the device.

Unfortunately, these approaches are not always convenient for the user to perform nor are they always secure. For example, there is currently no convenient way to ensure a user requesting out-of-box device and network configuration is the actual owner of the device. Similarly, there is no convenient way for the network service provider to ensure the device being configured is the correct device to activate in association with the subscribed user. Furthermore, these methods require manual interaction with the network in order to complete the activation, which is not feasible for certain devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 1B and 1C are state diagrams depicting the operation of a transmitter and a management platform for enabling a device for use over a communication network, according to various embodiments;

FIGS. 3A-3D are flowcharts of processes for enabling a device for use over a communication network, according to various embodiments;

FIGS. 4A-4C are diagrams of an interaction between a user, a device, a transmitter and a service provider, according to various embodiments;

DESCRIPTION OF THE PREFERRED EMBODIMENT

An apparatus, method and software for activating a device for use over a communication network is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to the configuring of mobile devices for execution over a wireless communication network, i.e., a long-term evolution (LTE) network, it is contemplated these embodiments have applicability to any systems wherein a communication device is required to operate in conjunction with a network for executing various of its functions. This may include, for example the provisioning, management, distribution, or enablement of content, services, data connections or channels, or the like on behalf of or directly upon a device relative to one or more network resources. For the purpose of illustration herein, the process of "configuring" or "readying" of a device may broadly refer any of the above described functions (e.g., provisioning or activating) unless expressly specified.

Figure 1A:
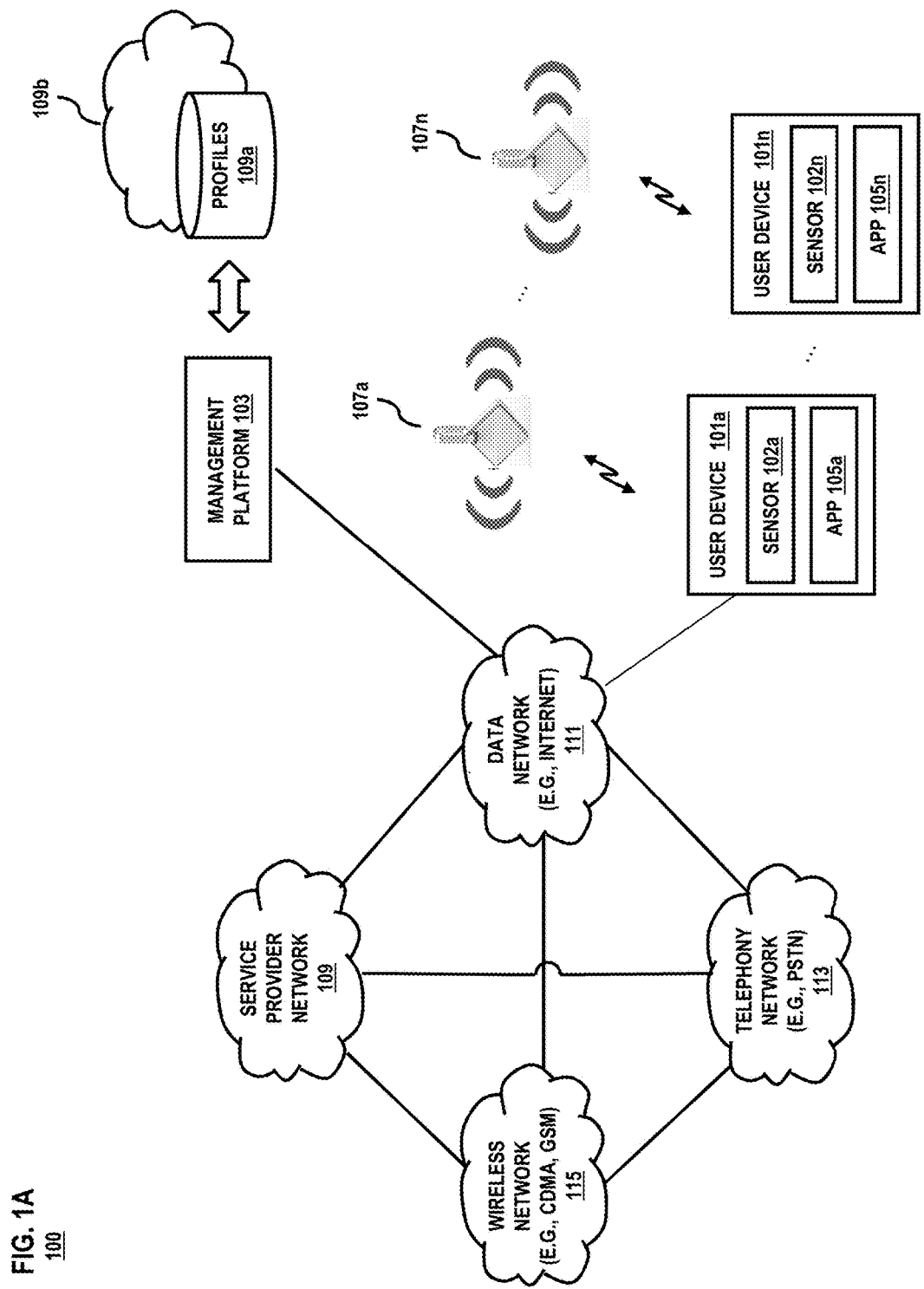
FIG. 1A is a diagram of a system for configuring a transmitter for activation of a device for use over a communication network, according to one embodiment.

FIG. 1A is a diagram of a system for configuring a transmitter for activation of a device for use over a communication network, according to one embodiment. The system 100 includes a management platform 103, which is configured to interact with a device (e.g., user device 101*a*-101*n*, referred to herein collectively as user devices 101) for facilitating the out-of-box device and network configuration process. The out-of-box configuration process may be performed after first time purchase of a device by a user (subscriber) to a communication network, such as service provider network 109. Alternatively, the out-of-box activation process may refer to subsequent activation of a user device 101 relative to the same or a different subscriber, such as for enabling specific data and networking services, expanding the network range of the device 101, updating the device, etc. Regardless of the scenario, the configuration process is a critical in readying the device for execution by end user as well as for enabling the service provider to manage and allocate network resources relative to the user device 101.

Typically, when a device is first removed from the box, the user may perform various device or user level customizations such as adjusting their screen settings, adapting their display preferences, creating a user profile, etc. In order for the device to be network ready, however, it must also be registered with the service provider network 109. The registration process may include authenticating and validating the device and/or user for access to the network and any services that require registration. In the case of high speed wireless communication services, such as those delivered over a long-term evolution (LTE) network, the registration procedure involves attaching the device to various nodes of the service provider network 109. Another step of the configuration process may include provisioning the device 101, which may deliver configuration data and policy settings information to an associated short range transmitter 107 for enabling certain network services (e.g., general packet radio service, instant messaging, mail).

In some cases, the out-of-box configuration process requires the user to call the service provider or visit a local store location so they or a technician can manually perform a series of steps to ready the device 101. For example, the user may be directed by a customer service representative to open a configuration interface of device 101 and enter various activation codes. In other instances, the service provider may utilize over-the-air (OTA) techniques in conjunction with reading of the subscriber identity module (SIM) card of the device as a means of automating the configuration procedure. OTA techniques may include transmitting provisioning data to the device 101 via an LTE signal or Bluetooth. Unfortunately, none of these approaches ensure that the correct device 101 is attempting to be configured for use over the network or that the correct user is attempting to employ the device.

For example, service providers and retailers currently have no means of distinguishing between an actual subscriber and a malicious user that attempts to activate an out-of-the box device using a stolen SIM card or fictitious subscriber credentials. Similarly, there is no convenient way to prevent a malicious user from activating the device by using the legitimate credentials of the user subscribed to the service provider network 109.

To address this issue, system 100 presents a management platform 103 enables configuration of a device 101 for execution over a network (e.g., service provider network 109) based on one or more of: (a) the exchange of signal information between the device 101 and the service provider network 109 or a resource thereof, (b) the validated pairing of the device with a transmitter associated with the device, (c) the validation of a device and/or pairing identifier associated with the device and/or the transmitter, or (d) a combination thereof. The pairing connection may be facilitated by way of any known short range communication protocols, such as Bluetooth or ZigBee, wherein participating devices 101 within range of one another establish a direct communication channel.

In one embodiment, the management platform 103 determines whether a pairing connection is formed between the user device 101 and a short range transmitter 107a-107n (referred to herein collectively as transmitters 107), i.e., a beacon device or ultra tag, based on a pairing identifier mutually associated with user device 101 and the transmitter 107. Under this scenario, the transmitter 107 may broadcast the pairing identifier to the device 101 according to a low energy Bluetooth protocol or the like. In another embodiment, the management platform 103 facilitates the exchange of provisioning data or other data for configuring the transmitter 107. The transmitter 107 is in turn used to interact with the device 101 via a pairing connection to enable use of the device 101 over a network 109. As such, a proximity or location based (pairing) validation requirement is introduced into the out-of-box configuration procedure for data exchange purposes as well for adding an additional layer of security and authentication.

In one embodiment, the transmitter 107 may be the only device contained within a box of, or associated with, a device 101 requiring configuration. The transmitter 107 may have affixed thereto a label, such as a barcode, image or other optical code (not shown) for encoding device identifier information for the device 101 it is associated with. Alternatively, the label may be placed in or on an instruction manual also contained within the box, affixed to or printed thereon a purchase or transaction receipt, etc. While not required, the above described approach of segregating the transmitter 107 required for facilitating the configuration process from the device 101 to be configured correlates to the proximity and/or location based means of security and network access validation. As will be discussed more fully, only the transmitter 107 that specifies the correct pairing identifier and device identifier may engage with the device via the management platform 103 for executing the configuration procedure.

In one embodiment, the management platform 103 may operate in connection with the service provider, the transmitter 107 and the user device 101 to facilitate the configuration process. By way of example, the management platform 103 may include one or more interfaces to a profile database 109a that maintains profile information regarding the various subscribers (users), such as name and account information, subscriber identifiers, service data, etc. In addition, the profiles may also specify information regarding the various registered and unregistered devices associated with the network, including equipment and/or device identifiers, network credentials, preferred roaming list information, etc. Still further, the profiles may specify the pairing identifier that is to be assigned to a transmitter 107 associated with the device 101. Under this scenario, the pairing identifier may be a beacon identifier or the like that is broadcast for establishing a short-range communication channel with the device 101. The pairing identifier may be preset to a specific value and format, i.e., Prefix+Random String, during the time of manufacture of the device 101. As such, the unique identity of the device 101 is recorded in association with the unique pairing identifier to be used for initial device configuration/provisioning/activation purposes.

It is noted that the profile database 109a may be accessed directly by the management platform 103 based on access or security credentials, gateway and/or network parameters, or the like granted directly by the service provider. Alternatively, the profile database 109a may be implemented as a cloud based solution 109b for direct access by the management platform 103. As such, the profile database 109b may serve as an external resource of the service provider for supporting profile access. For the purpose of illustration herein, profile databases 109a and 109b are referred to herein as databases 109 for encompassing any means of implementation. Also of note, as will be discussed further later on herein, the management platform 103 may interact with various communication nodes of the service provider network 109. This may include enabling the sending and/or receiving of signals from the various cellular towers, base stations, gateways, etc., comprising the communication network.

In one embodiment, the management platform 103 interacts with the device 101 by way of a configuration application, referred to herein as application 105. The application 105 may execute various application programming interface (API) functions for supporting the configuration process for the end user, including generating messages to the device 101 display for indicating the status and/or requirements to be fulfilled for completing the configuration. By way of example, the application 105 may be used to activate the transmitter 107 (contained in the box) that is associated with the device 101. This may correspond to an initial step in the overall configuration process and may include scanning the label information associated with the transmitter 107.

In one embodiment, the label information is subsequently processed by the management platform 103 to determine the device identifier information encoded therein. Under this scenario, the management platform 103 cross references the device identifier against the profile database 103 (e.g., a cloud based solution) in order to retrieve the pairing identifier assigned to the transmitter 107 and/or associated device thereof. Once determined, the pairing identifier is shared with the application 105, which in turn causes the application 105 to activate a sensor 102 for detecting signals broadcast by nearby devices, such as by way of Bluetooth. Alternatively, the application 105 may generate a message to a display of the user device 101 for requesting the user to manually activate the sensor 102.

In one embodiment, the application 105 also generates messages for instructing the user to activate (power on) the transmitter 107 and place it within range of the device 101. This may include, for example, instructing the user to press a power on button of the transmitter 107 to initiate low energy broadcasting of the pairing identifier. The application 105 may also utilize the sensors 102 to detect the pairing identifier, determine the pairing identifier is a connection match, and establish a pairing connection between the device 101 and the transmitter 107 accordingly. Still further, the application 105 may further transmit notification messages to the management platform 103 for indicating a pairing connection is established. In one embodiment, the pairing connection may be time based, such that failure to pair the devices within x seconds prevents establishment of the pairing connection. It is noted that this approach may enable further security, theft or anti-spoofing applications.

In addition, various other messages including additional user instructions, error messages, or the like may be rendered by the application during and throughout the registration and provisioning process. As will be discussed further later on herein, the error messages may correspond to those presented for indicating a failure to fulfill a connection between respective devices 101 and transmitter 107, failure to validate a device or transmitter for us in connection with each other, failure to complete the registration or provisioning steps, etc. The registration and provisioning procedures may correspond to any known or still developing procedures or data networking standards (e.g., 3GPP Registration Procedures). It is noted that the types of messages rendered of executions performed by the application 105 with respect to the device 101 may vary depending on the specific configuration approach facilitated by the management platform 103.

In one embodiment, the management platform 103 conveys location information to the transmitter 107 or the application for enabling commencement of the registration or provisioning of the device for user over the network 109. By way of example, the location information may be assisted global positioning data (AGPS), which may be used for matching the location of the device 101, the transmitter 107, or a combination thereof with the location of the nearest communication node of the service provider network 109. The nearest communication node may be identified by referencing the preferred roaming list or other registration information for supporting attachment of the device 101 to the network 109.

Figure 1B:
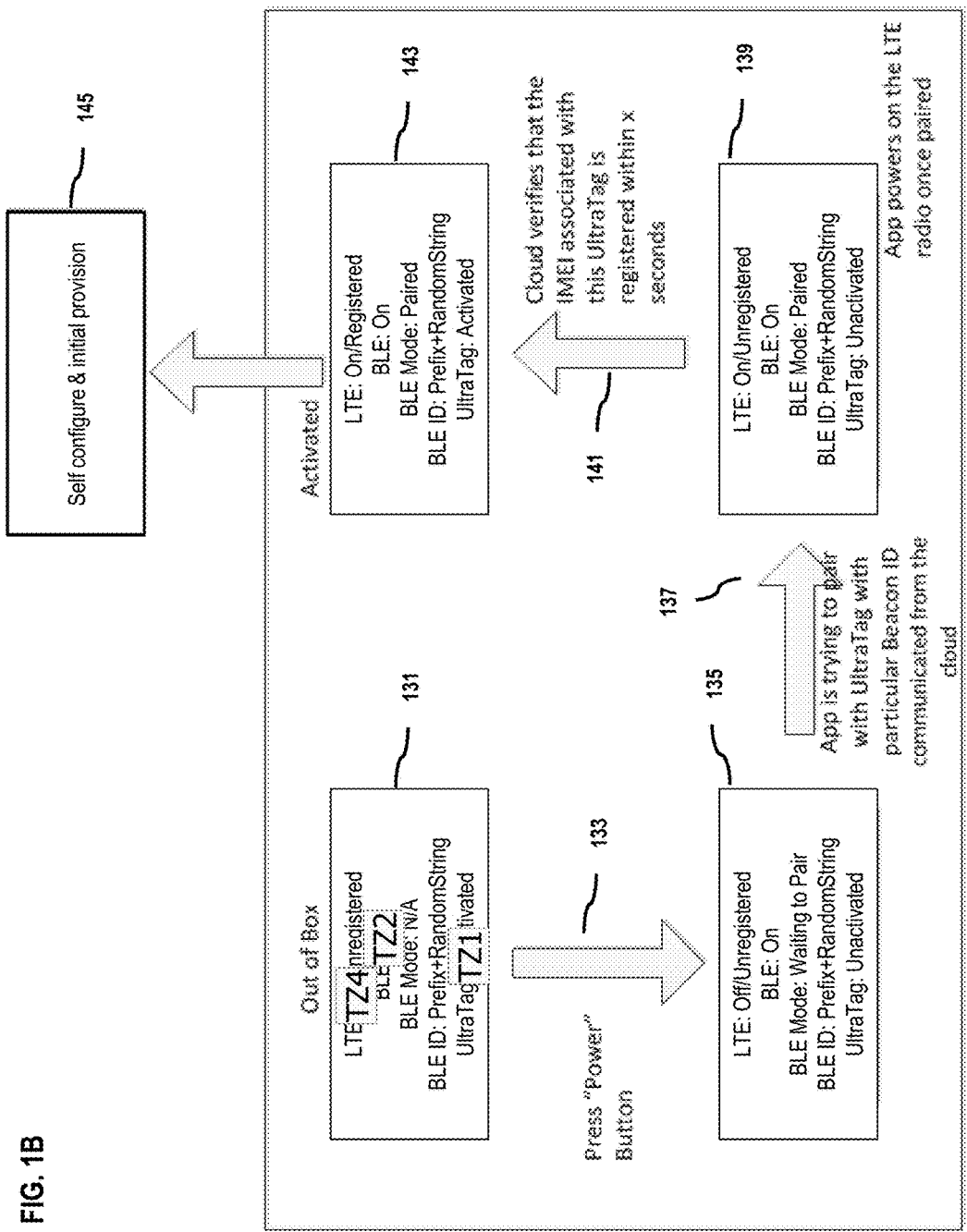

In one embodiment, the management platform 103 facilitates the above described configuration process, i.e., registration, provisioning, etc., based on different modes of operation. In a first mode of operation, an LTE radio of a device 101 may be turned on in conjunction with the turning on of the transmitter 107, prior to registration, while in a second mode of operation, the LTE radio is not activated until registration is complete. Also, per the first mode of operation, the management platform 103 facilitates the transmission of assisted global positioning (AGPS) data to the transmitter 107 by way of an LTE signal connection formulated between the management platform 102 and the transmitter 107. In contrast, per the second mode of operation, the management platform 103 facilitates the transmission of assisted global positioning (AGPS) data to the application 103. This AGPS data is then transferred from the application 103 to the transmitter 107 by way of the pairing connection (e.g., Bluetooth). For the purpose of illustration, emphasis will be placed herein on the second mode of operation. More regarding this mode of operation will be presented with respect to FIGS. 4A-4D. In FIGS. 1B and 1C respectively, state diagrams for indicating the operating state and/or status of the transmitter 107 and management platform 103 (or profile database 109) throughout the configuration process, according to this second mode of operation, is presented.

By way of example, in FIG. 1B, state 131 corresponds to an initial opening of the transmitter 107 corresponding to the user device 101 from a box. This may be when the device is first purchased from a retail location, received in the mail, etc. In this example, the transmitter is an UltraTag device for transmitting a beacon identifier, corresponding to the pairing identifier. In this state 131, the transmitter 101 is UNACTIVATED and therefore not actively transmitting its pairing identifier, i.e., Bluetooth low energy identifier (referred to in as the BLE ID). Also, the LTE radio of the device 101 to be configured is in an OFF state and the LTE signaling capabilities of the device are in an UNREGISTERED state, meaning the device is not yet attached to the network. Similarly, the sensor 102 for detecting the beacon identifier, referenced in this example as the BLE sensor is also OFF.

Once the user powers on the UltraTag (e.g., transmitter 107), the transmitter enters into another state 135, wherein it begins to broadcast its BLE ID. Also, corresponding to this state 135, the BLE sensor of the device is ON. Thus, the transmitter 107 and device are actively seeking to pair with one another based on the mutually identified pairing identifier as retrieved from the profile database, corresponding to transitional execution 137. Once the pairing occurs, per state 139, the application 103 powers on the LTE radio of the device 101. While the LTE radio is ON, this does not yet correspond to completion of the device attachment/registration process. The management platform 103 must first verify that the unique device identifier (e.g., international mobile equipment identifier (IMEI)) associated with the beacon identifier of the UltraTag is registered within a predetermined number of seconds, corresponding to transitional execution 141.

Once the IMEI is validated as being associated with the beacon identifier, the transmitter 107 enters into an ACTIVATED state. Similarly, the LTE radio enters into a REGISTERED state, thus signifying formal completion of the attachment/registration process. Upon completion, the management platform 103 may then further interact with the transmitter 107 and device 101 to execute the provisioning procedure of the overall configuration process, corresponding to state 145.

By way of example, in FIG. 1C, state 149 corresponds to an initial execution of the management platform 103 in response to receipt of an execution request per step 147 to activate the transmitter (e.g., UltraTag) 107 associated with the user device 101. Per this state, the transmitter is UNACTIVATED, no BLE pairing, and the LTE radio and all signaling activity or registration is inactive. This state is maintained as the management platform 103 waits to validate the IMEI associated with the device 101 and the assigned pairing identifier. If this fails, per state 153, a fail over procedure may be invoked for the management platform 103 to activate the transmitter via device identifier means. In the case where the validation occurs per step 155, the corresponding pairing identifier (e.g., beacon identifier) is transmitted to the application 105, and a pairing result is awaited by the platform 159. It is noted that the state 157 is identical to that of 149 pending formation of the pairing connection.

In the case where no pairing connection is formed, per state 161, a failure message may be generated for indicating this status. The message may also prompt the user to move the device next to or closer to the transmitter as well as ensure that BLE connectivity is engaged for the device 101 and/or UltraTag 107. Once pairing occurs per step 163, corresponding to a BLE Paired status of YES, a command is initiated to power ON the LTE radio, thus enabling LTE Signal status to be YES. The LTE registration result, however, remains NO pending a registration completion result for the device and/or user per step 167.

When no result is returned, the management platform 103 may generate a message for prompting the user to move in case of a poor signal. The platform 103 keeps monitoring for a signal for a period of time, after which, a failure message is generated and rendered to the user. In the case where a registration result is rendered, per step 171, the transmitter, pairing and LTE statuses are all active, corresponding to completion of device 101 activation per step 175. The provisioning and user/self configuration settings procedure may be commenced.

It is noted that the management platform 103 may support the generation of various messages throughout the configuration process, including those for facilitating the retrieval of registration information to be used for completing the network registration process from the profile database 103 as well as for indicating a status of a provisioning procedure of the device 101 with respect to the network 109. Hence, the management platform 103 may facilitate end user and service provider/enterprise level executions. Still further, use of the transmitter 107 as an intermediary signaling device requires an additional layer of data transference and validation for to be achieved in order for proper and complete device registration and provisioning to be enabled with respect to the communication network 109.

It is noted that user devices 101 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the devices 101 can support any type of interface for supporting the presentment or exchanging of data. In addition, user devices 101 may facilitate various input means for receiving and generating information, including touch screen capability, keyboard and keypad data entry, voice-based input mechanisms and the like. For example, during an initial downloading of the application 105, the user may employ a touch screen interface of the device 101 in order to provider login credentials for authenticating the application for use with the management platform 103. Any known and future implementations of user devices 101 are applicable.

In certain embodiments, user devices 101a-101n, the management platform 103 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
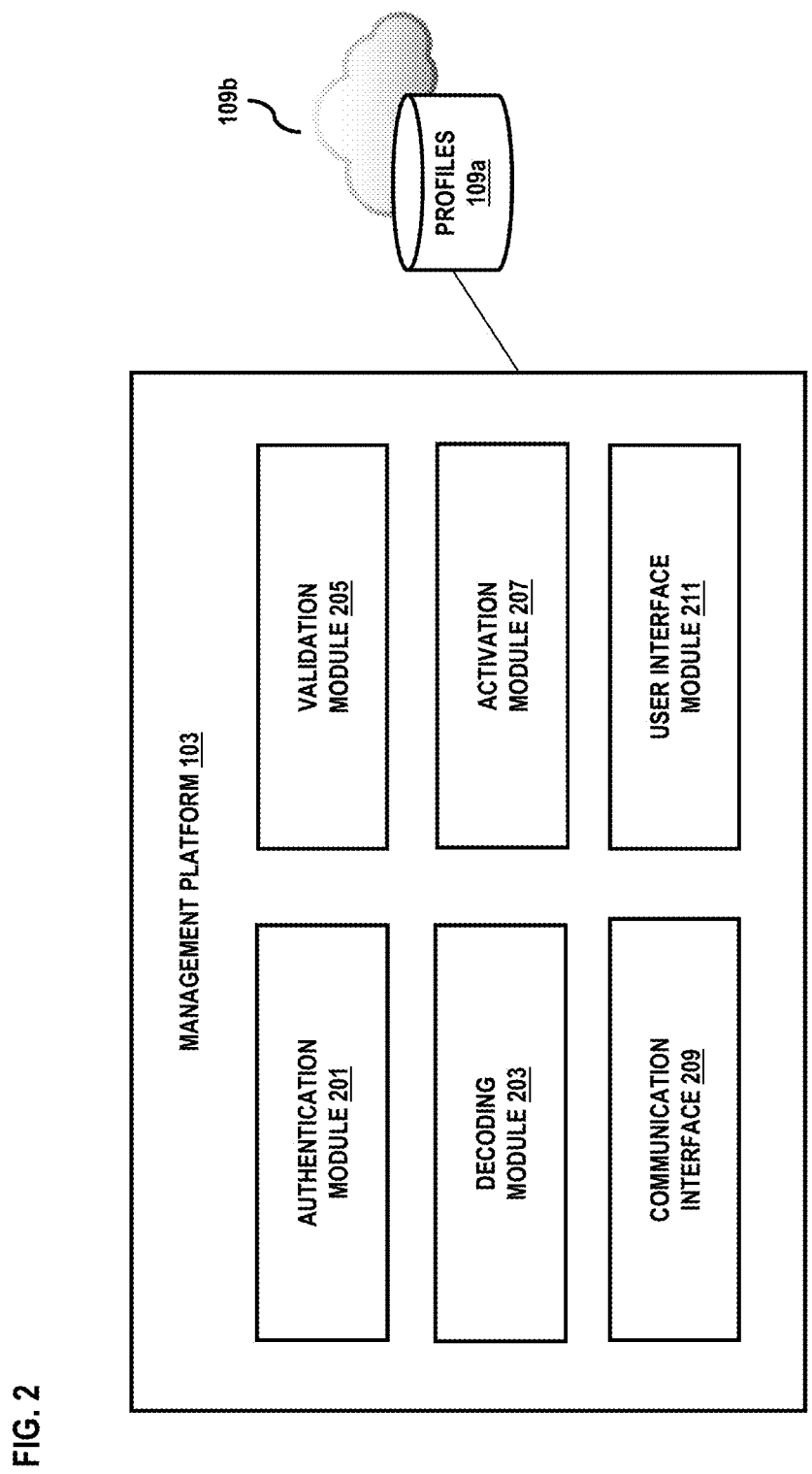
FIG. 2 is a diagram of a management platform, according to one embodiment.
Figure 3A:
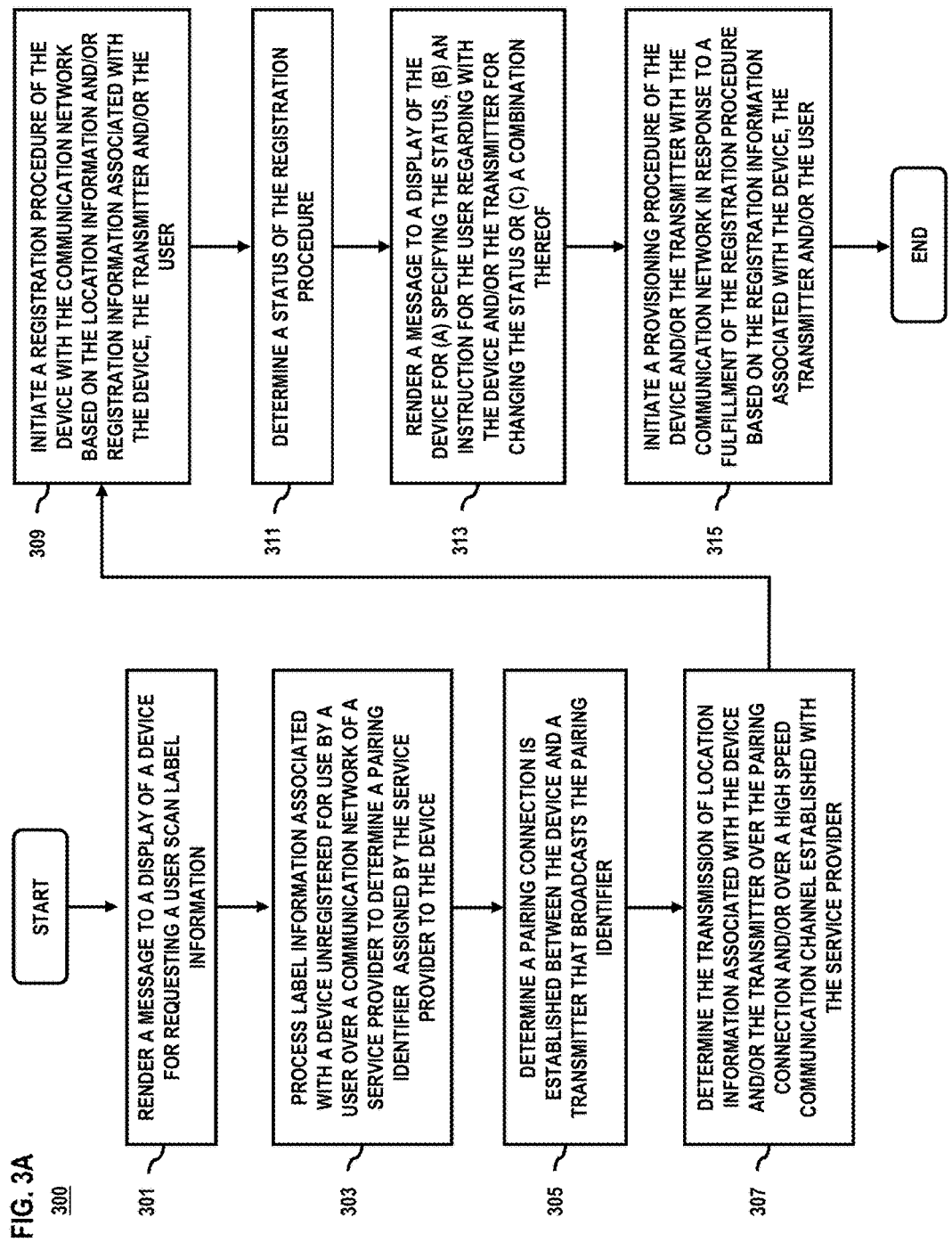
Figure 3D:
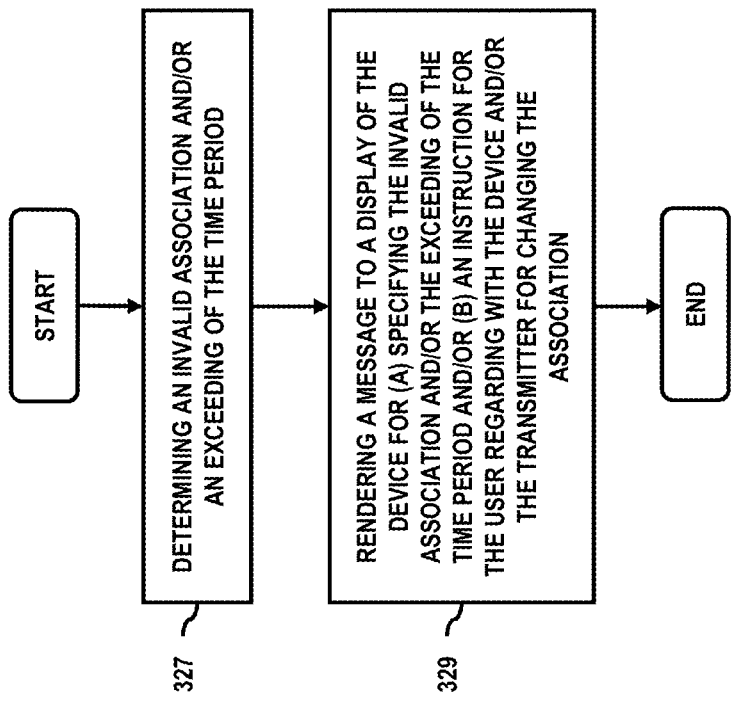

FIG. 2 is a diagram of a management platform, according to one embodiment. The management platform 103 includes various executable modules for performing one or more computing, data processing and network based instructions that in combination provide a means for configuring a device for use over a communication network. Such modules can be implemented in hardware, firmware, software, or a combination thereof. By way of example, the management platform 103 may include an authentication module 201, a decoding module 203, a validation module 205, an activation module 207, a communication interface 209 and a user interface module 211. In addition, the management platform 103 may also access profiles from a profile database 109 for enabling execution of the various modules 201-211.

In one embodiment, the authentication module 201 authenticates a device, a user or a transmitter 107 for use of the management platform 103. By way of example, the authentication module 201 receives a request to download the application 105 and facilitates processing of any user specified credentials entered. This may include, for example, authenticating a supplied user name, customer account number, mobile device number, network IP address, or other credential associated with the user and/or their subscription with the service provider; by comparing the entered data against logged profile 109. Automatic login procedures may also be facilitated by automatically associating an IP address, a carrier detection signal of a user device, mobile directory number (MDN), subscriber identity module (SIM) (e.g., of a SIM card), radio frequency identifier (RFID) tag or other identifier against the registration data.

Still further, the authentication module 201 may also receive requests to activate a transmitter 107 for registering a device. Upon receipt of the label information pertaining to the transmitter 107, the authentication module 201 interacts with the decoding module 203 to determine the encoded device identifier. Once determined, the authentication module 201 identifies and retrieves the pairing identifier corresponding to the device identifier if it exists. In the case it is found, the authentication module 201 passes the pairing identifier to the communication interface 209, which in turn conveys the corresponding pairing identifier to the application 105 of the device 101. When it is not found, a failure message may be generated by the user interface module 211 for indicating the failure condition and one or more instructions for the user and subsequently transferred by the communication interface 209. It is noted that the decoding module may employ various techniques for decoding and/or deciphering various types of labels, including optical codes, an images, tags, or a combination thereof.

In one embodiment, the validation module 205 determines and/or validates various conditions, messages and procedures are performed appropriately throughout the activation process. In addition, the validation module 205 may initiate the rendering of an error or fulfillment message by the user interface module 213 in response to a determination. For example, the validation module 205 determines receipt of a message from the service provider, i.e., via the cloud service of the provider, for indicating submission of the pairing identifier (e.g., beacon identifier). As another example, the validation module may determine a valid association between the device identifier and the pairing identifier. Still further, the validation module 205 may persistently monitor the operating state of the transmitter 107 and device 101, such as per FIGS. 1B and 1C, for determining the state of completion of the registration or provisioning process. In the case where a particular operating state is validated, the validation module 205 may invoke the activation module 207 to enable any known or standard registration or provisioning procedures.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The above presented modules and components of the management platform 103 can be implemented in hardware, firmware, software, or a combination thereof. Though depicted as a separate entity in FIG. 1, it is contemplated that the management platform 103 may be implemented for direct operation by respective devices 101. As such, the management platform 103 may generate direct signal inputs by way of the operating system of the device 101 for interacting with the application 105 and accessing profiles from databases 109a and 109b. In another embodiment, one or more of the modules 201-211 may be implemented for operation by respective user devices as a platform 103 (e.g., a hosted solution), as a distributed system, or combination thereof.

Figure 6:
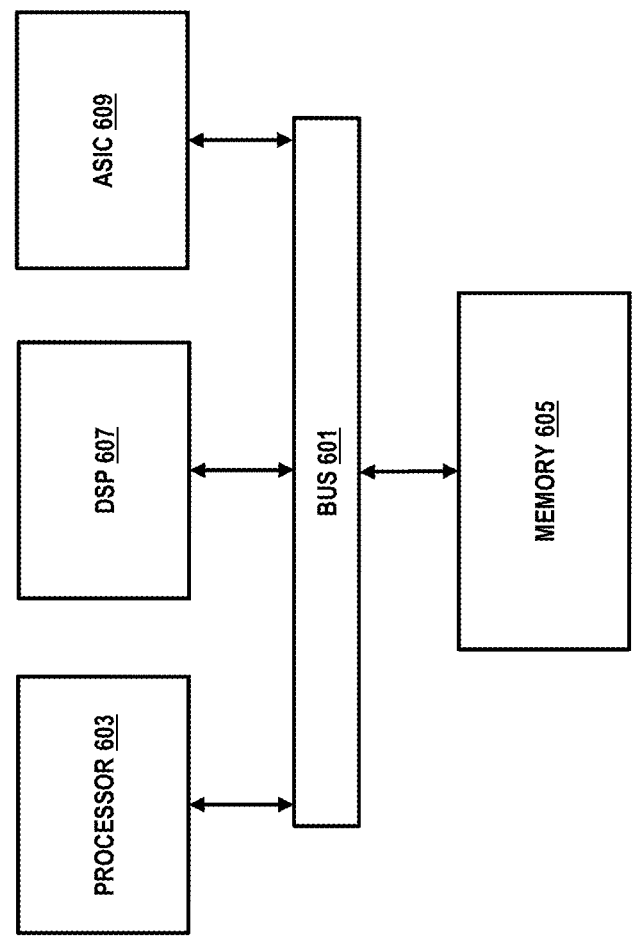
FIG. 6 is a diagram of a chip set that can be used to implement an embodiment of the invention.

FIGS. 3A-3D are flowcharts of processes for enabling a device for use over a communication network, according to various embodiments. In one embodiment, the management platform 103 performs processes 300, 316, 322 and 326, and are implemented in, for instance, a chip set including a processor and a memory as shown in FIG. 6.

In step 301 of process 300 (FIG. 3A), the management platform 103 renders a message to a display of a device for requesting a user scan label information associated with a transmitter assigned to the device. This corresponds to an initiation state of activation of an out-of-the box device requiring configuration (e.g., registration, provisioning, etc.) relative to a communication network of a service provider. Per step 303, the platform 103 processes label information associated with a device unregistered for use by a user over a communication network of a service provider to determine a pairing identifier assigned by the service provider to a transmitter associated with the device. The transmitter may be a beacon device, an UltraTag, or any other short range wireless signal broadcasting device. In another step 305, the platform 103 determines a pairing connection is established between the device and the transmitter based on the pairing identifier. As noted previously, the pairing identifier may be assigned by the service provider relative to a specific device and transmitter to be used for enabling the configuration procedure.

In another step 307, the platform 103 determines the transmission of location information associated with the device, the transmitter, or a combination thereof over the pairing connection, over a high speed communication channel established with the service provider, or a combination thereof. By way of example, the location information may be assisted global positioning system (AGPS) data, as determined by the management platform, for identifying a relative location of the user, the transmitter or the device. Per step 309, the platform 103 initiates a registration procedure of the device with the communication network based on the location information, registration information associated with the device, the transmitter, the user, or a combination thereof, or a combination thereof. As noted previously, the registration information may include an equipment identifier, a subscriber identifier, a resource identifier, security credentials, a directory number, a preferred roaming list, programming code data or a combination thereof and the pairing connection is established based on the validation.

In step 311, the management platform 103 determines a status of the registration procedure. For example, this may include determining whether the registration procedure, or a step thereof, was fulfilled and/or validated. In another step 313, the platform 103 renders a message to a display of the device for (a) specifying the status, (b) an instruction for the user regarding with the device, the transmitter, or a combination thereof for changing the status, or (c) a combination thereof. It is noted that fulfillment of the registration procedure results in activation of the device for use over the communication network.

In step 315, the management platform 103 initiates a provisioning procedure of the device, the transmitter, or a combination thereof with the communication network in response to a fulfillment of the registration procedure based on the registration information associated with the device, the transmitter, the user, or a combination thereof. The provisioning procedure may include (a) updating the pairing identifier, the location information, or a combination thereof, (b) activating a service, a function, an application, a resource, or a combination thereof of the device, the transmitter, the communication network, or a combination thereof for use by the user, or (c) a combination thereof.

In step 317 or process 316 (FIG. 3B), the management platform 103 determines the activation of a radio of the device based on the pairing connection, the registration information, or a combination thereof. For example, the radio may correspond to an LTE radio for establishing a LTE connection with the communication network. Also, the pairing connection may be based on a short range wireless protocol, such as Bluetooth. Thus, the platform 103 enables signal and data exchange according to either or both a high speed signal protocol or a low energy short range wireless protocol.

In step 319, the platform 103 matches the location of the device, the transmitter, or a combination thereof with the location of a communication node of the communication network based on the location information, the activation of the radio, or a combination thereof. This may include as well evaluating of the location information against a preferred roaming list associated with the device, the network, or a combination thereof. Per step 321, the platform 103 establishes the high speed communication channel based on the match, wherein the high speed communication channel is established (1) according to a high speed broadband communication protocol, (2) over a high speed frequency band, or (3) a combination thereof.

In step 323 of process 322 (FIG. 3C), the management platform 103 validates an association between the pairing identifier and the device, the user, or a combination thereof based on the registration information. In another step 325, the platform 103 determines the validation occurs within a predetermined time period. As noted previously, the time period may be established by the service provider for enabling an enhanced level of authentication.

In step 327 of process 326, the management platform 103 determines an invalid association, an exceeding of the time period, or a combination thereof. Per step 329, the platform 103 renders a message to a display of the device for (a) specifying the invalid association, the exceeding of the time period, or a combination thereof, (b) an instruction for the user regarding with the device, the transmitter, or a combination thereof for changing the association, or (c) a combination thereof.

Figure 4B:
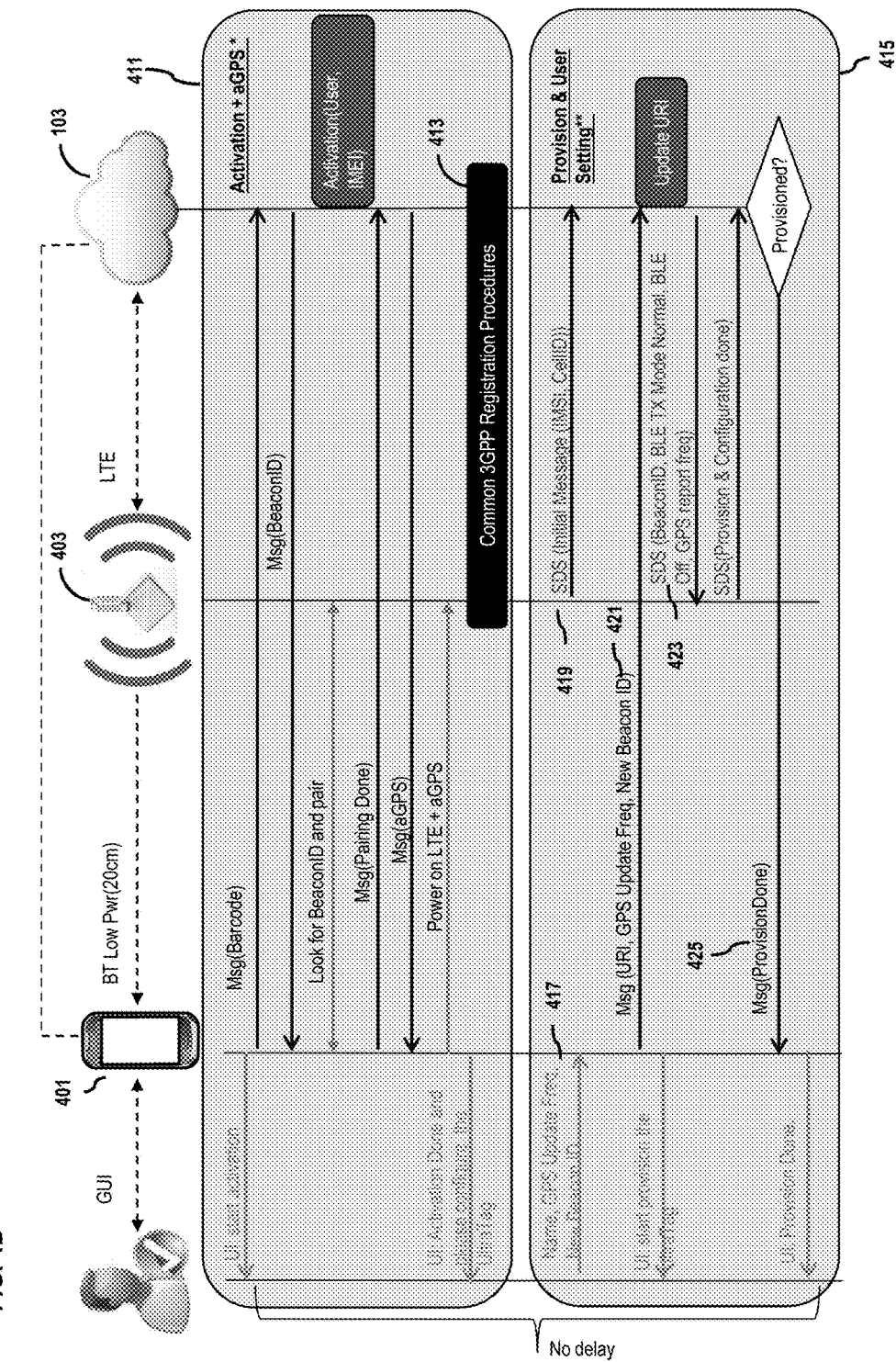
Figure 4C:
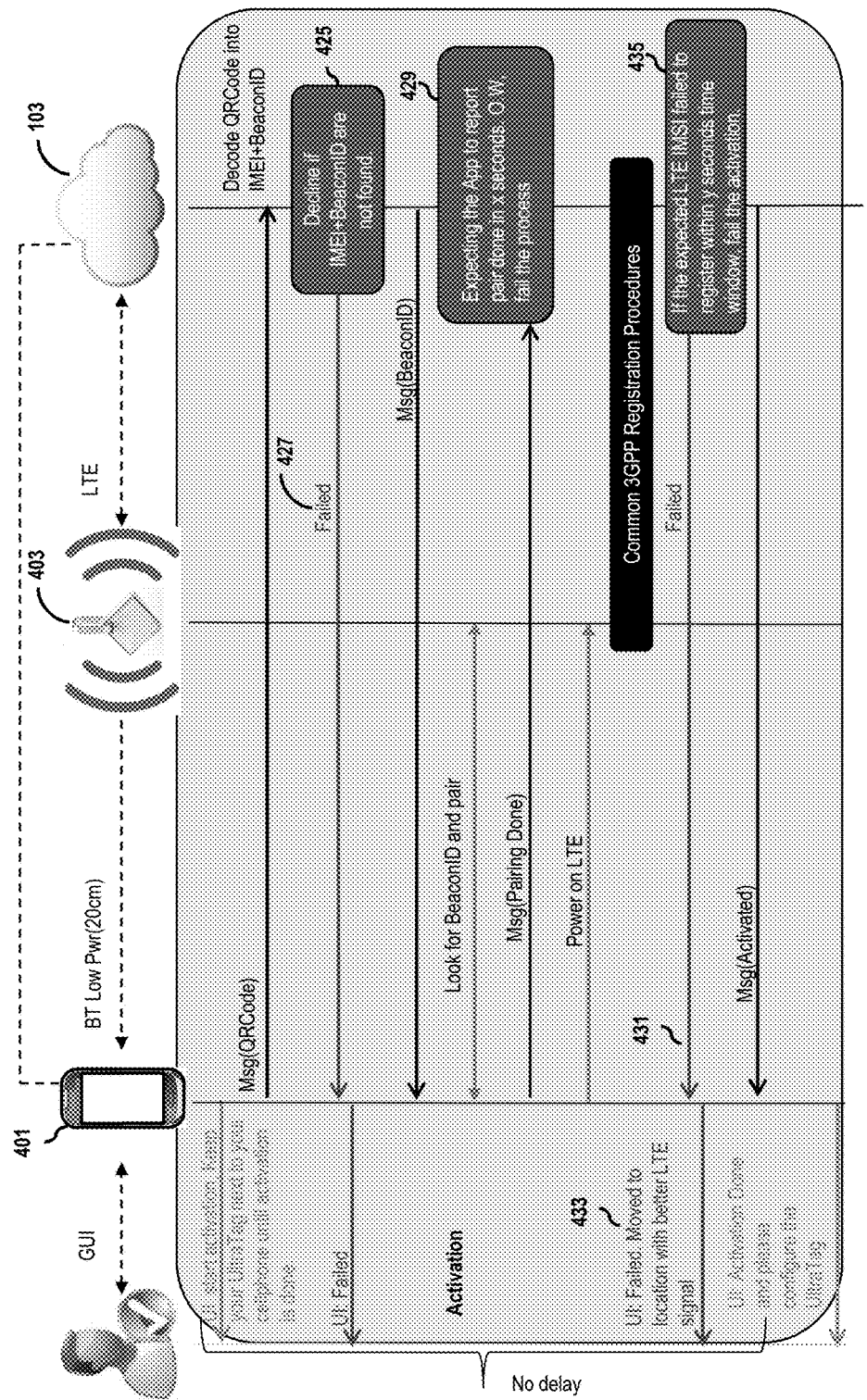

FIGS. 4A-4C are diagrams of an interaction between a user, a device, a transmitter and a service provider, according to various embodiments. For the purpose of illustration, the interaction is related to a user that wishes to configure the transmitter 403 to enable it to interact with a smartphone 401. This interaction is required for activating the smartphone 401 for use over a communication network to which they are subscribed.

In FIG. 4A, the user opens the box associated with the phone corresponding to event A. In this case, the box only contains a printed set of activation instructions (not shown) and an UltraTag transmitter 403. Also, the instruction manual includes label information in the form of a quick response (QR) code. It is noted that the smartphone 401 need not be contained within the box for security reasons. By segregating the smartphone 401 from the box and/or transmitter 403, the activation process may be executed at the discretion of the user and at a place of the user's choosing.

Following the instructions, the user installs the configuration application 405 to their smartphone 401, corresponding to event B. The installation may be initiated by scanning the QR code 407 associated with the UltraTag device 403, resulting in automated retrieval and downloading of the application 405 to the device 401. Alternatively, the user may be prompted to retrieve the application 405 from an online content or application provider. Still further, in certain instances, the application may already be preloaded to the smartphone 401.

Once installed, the user starts the application 405 and enters their login and/or account signup credentials. This may correspond to a secure sign-on procedure if the user is an existing subscriber or a first time activation or data entry for a new subscriber. Certain information, such as the current mobile number, email address, or other information may be required to be entered.

Per event C, the user then invokes an option to "Activate a New UltraTag" per the application 405 and is prompted to scan the QR code to kick off the activation process. Upon scanning the code 407, it is sent to the management platform (e.g., a cloud based resource associated with the service provider) for processing. The management platform 103 processed the code 407 to determine a corresponding BeaconID (e.g., pairing identifier) associated with the transmitter 403 and returns this value to the application 405. The application then prompts the user to perform various actions in response to receiving a valid associated BeaconID, including:

1) Turn on the Bluetooth sensor of the smartphone 401 (or the application may enable this capability automatically)
2) Power on the UltraTag device 403
3) Place the UltraTag device 403 next to the smartphone 401

It is noted that steps 2 and 3 above correspond to events D and E. In the case of event D, the user may press a one touch/one time power button of the UltraTag device to power it on. Under this scenario, a Bluetooth low energy function may also be powered on at the user device 401 in the case where pairing is supported. In the case of event E, the application 405 causes the sensor of the device 401 to identify the BeaconID and establish a pairing connection with the UltraTag (only the one transmitting the correct BeaconID). It is noted, by default, that the BeaconID may be preset to a "Prefix+RandomString" during manufacturing time. Also, Bluetooth may be preset to transmit in a low power mode (~20 cm).

Per event F, AGPS data is downloaded to the application 405 from the management platform 103. Next, the data is transmitted from the application 405 to the UltraTag 403 by way of the established Bluetooth pairing connection. For the purpose of illustration, events A-F are depicted in the ladder diagram of FIG. 4B, corresponding to the interactive steps 411 labeled collectively as Activation+AGPS. Upon transferring the location information, the management platform 103 then facilitates any known device registration procedures, corresponding to step 413. This may include carrying out procedures for attaching the device to a bearer node and eventually a dedicated node of the communication network for enabling long term evolution communication of the device 401.

Once the device is registered per steps 411, additional steps for carrying out the provisioning process are performed per the various steps 415 labeled collectively as Provision & User Setting. This may include, for example, prompting the retrieval of updated location information for the device 401 and/or transmitter 403 as well as retrieval of a new BeaconID for transmitter pairing. Other steps may include the transmitting of short data service (SDS) messages from the UltraTag 403 to the platform 103 for indicating the mobile and subscriber identifier values associated with the user along with the sending of pertinent registration information to the platform 103 from the application 405 at the device 403. Still further, updated BeaconID and location information is then sent to the transmitter 403, per step 423, for completing the provisioning procedure. If provisioned properly, a completion message 425 is also sent to the application 405 of the device 401.

It is noted that collective steps, or phases 411 and 415, may be carried out with little delay. Also, as an alternative step of the Activation+AGPS phase 411, the smartphone 401 can read the device identifier from the UltraTag 403 directly and compare the barcode with the device identifier to activate the user. Also, per the Provision and User Setting phase 415, alternatively the configuration provisioning data packets can be carried over the Bluetooth connection instead of via the LTE connection.

FIG. 4C depicts the activation phase 411 in the case where various failures (invalid results) are determined. For example, during initial activation of the application for scanning the QR code 407, a failure message is returned to the application in the case where the code does not correspond to the device identifier, corresponding to steps 427 and 425 respectively. This may result in a retry or rendering of the failure message to the display of the device 401. As another point of validation 429, the platform 103 may determine whether a successful pairing event occurred within x seconds. Lack of fulfillment of this requirement may further result in a failure message being sent to the application, as per step 431. The failure message may specify instructions for the user to follow to correct the failure, i.e., move to a location with better signal strengths as in step 433. In the case where a second failed attempt to pair within a predetermined period of y seconds, the entire activation procedure may be cancelled.

It is noted that the above described approach forces a user to ensure they are associating the correct device with the correct activation transmitter. Failure to properly associate the devices and formulate a pairing connection within the proper time frame results in inability to access the communication network and provision the services of the network. This is particularly useful for thwarting instances of theft of a new device as the registration and provisioning processes are tied to various types of authentication (user, device and network based) and validation (location, proximity and time based). Per the interaction between the device and the transmitter, and the requirements thereof, a communication service provider is better able to manage the experience of the user as they configure their device for use over the communication network.

The processes described herein for configuring a device for use over a communication network may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
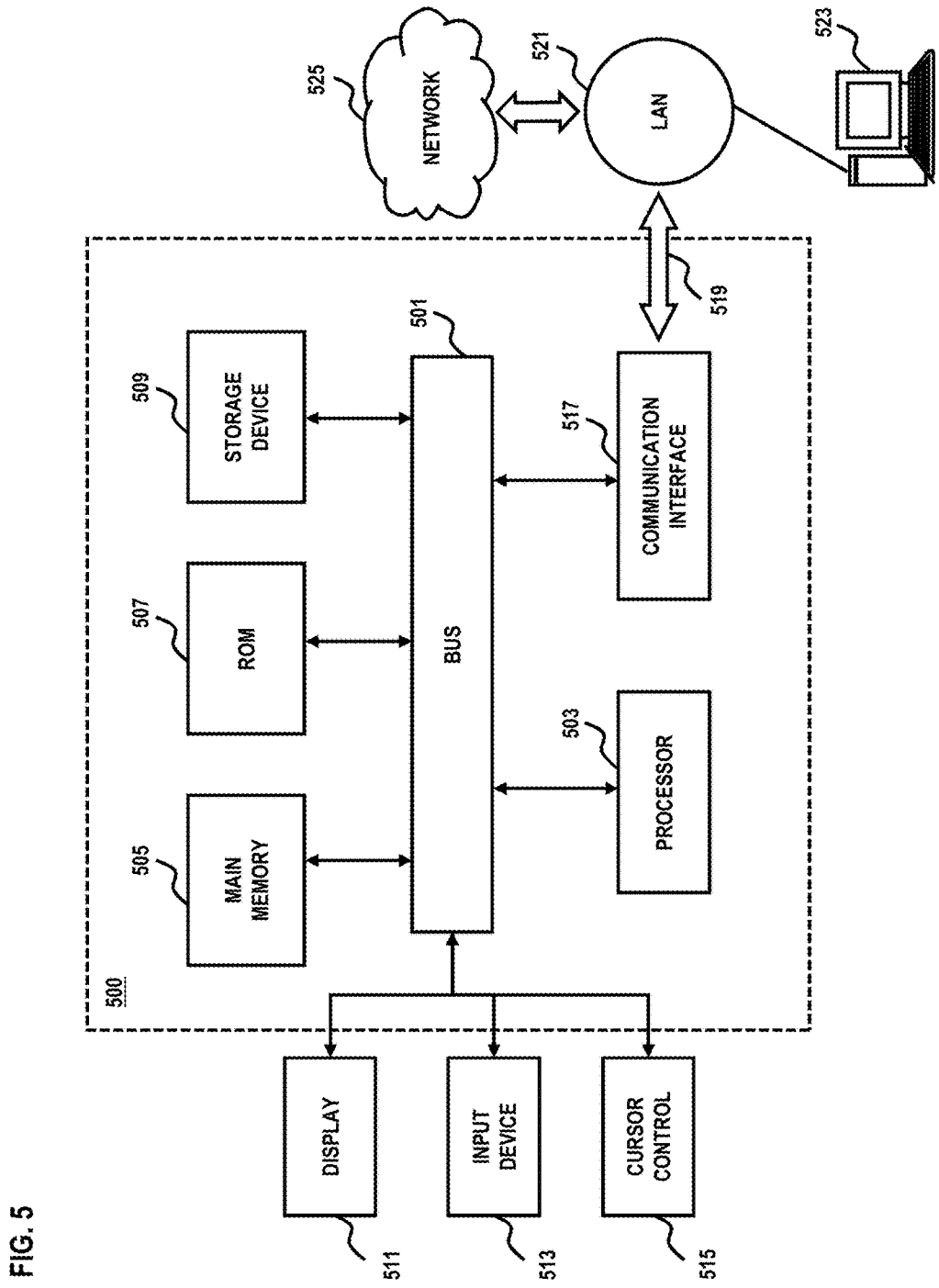
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to ready a device for use over a communication network as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of configuring a device for use over a communication network.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to ready a device for use over a communication network. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. A method comprising:
receiving label information from a user device that is not registered for use by a user over a communication network of a service provider, the label information having been input, at the user device, via an optical label recognition process performed by the device;
processing the label information to determine a pairing identifier, assigned by the service provider, to a transmitter, wherein the transmitter is different than the user device and the transmitter includes a short range wireless broadcasting device;
transmitting the pairing identifier to the user device;
determining that a pairing connection has been established, based on the pairing identifier, between the user device and the transmitter;
receiving location information that identifies a location of the user device or the transmitter; and
initiating a registration procedure of the user device, with the communication network, when the pairing connection was successfully established, the registration procedure being additionally based on the location information.

2. The method of claim 1, further comprising:
determining a status of the registration procedure; and
rendering a message to a display of the user device for (a) specifying the status, (b) an instruction for the user regarding the user device, the transmitter, or (c) a combination thereof,
wherein fulfillment of the registration procedure results in activation of the device for use over the communication network.

3. The method of claim 2, further comprising:
determining an activation of a radio of the user device based on the pairing connection; and
matching the location of the user device, the transmitter, or a combination thereof with a location of a communication node of the communication network based on the location information.

4. The method of claim 3, further comprising:
establishing a high speed communication channel, between the service provider and the user device, based on the match,
wherein the high speed communication channel is established (1) according to a high speed broadband communication protocol, (2) over a high speed frequency band, or (3) a combination thereof.

5. The method of claim 1, further comprising:
initiating a provisioning procedure of the user device, the transmitter, or a combination thereof with the communication network in response to a fulfillment of the registration procedure.

6. The method of claim 5, wherein the provisioning procedure includes (a) updating the pairing identifier, the location information, or a combination thereof, or (b) activating a service, a function, an application, a resource, or a combination thereof of the user device, the transmitter, the communication network, or a combination thereof for use by the user.

7. The method of claim 1, further comprising:
validating an association between the pairing identifier and the user device;
determining the validation occurs within a predetermined time period; and
providing an error message to the user device when the validation does not occur within the predetermined time period.

8. The method of claim 1, further comprising:
rendering a message to a display of the user device for requesting the user to scan the label information,
wherein the processing of the label information is based on the scanning and the label information is an optical code, an image, a tag, or a combination thereof.

9. An apparatus comprising a processor configured to:
receive label information from a user device that is not registered for use by a user over a communication network of a service provider, the label information having been input, at the user device, via an optical label recognition process performed by the user device;
process the label information to determine a pairing identifier assigned by the service provider, to a transmitter, wherein the transmitter is different than the user device and the transmitter includes a short range wireless broadcasting device;
transmit the pairing identifier to the user device;
determine that a pairing connection has been established, based on the pairing identifier, between the user device and the transmitter;
receive location information that identifies a location of the user device or the transmitter; and
initiate a registration procedure of the user device, with the communication network, when the pairing connection was successfully established, the registration procedure being additionally based on the location information.

10. The apparatus of claim 9, wherein the processor is further configured to:
determine a status of the registration procedure; and
render a message to a display of the user device for (a) specifying the status, (b) an instruction for the user regarding the user device, the transmitter, or (c) a combination thereof,
wherein fulfillment of the registration procedure results in activation of the user device for use over the communication network.

11. The apparatus of claim 10, wherein the processor is further configured to:
determine an activation of a radio of the user device based on the pairing connection; and
match the location of the user device, the transmitter, or a combination thereof with a location of a communication node of the communication network based on the location information.

12. The apparatus of claim 11, wherein the processor is further configured to:
establish a high speed communication channel, between the service provider and the user device, based on the match,
wherein the high speed communication channel is established (1) according to a high speed broadband communication protocol, (2) over a high speed frequency band, or (3) a combination thereof.

13. The apparatus of claim 9, wherein the processor is further configured to:

initiate a provisioning procedure of the user device, the transmitter, or a combination thereof with the communication network in response to a fulfillment of the registration procedure.

14. The method of claim 13, wherein the provisioning procedure includes (a) updating the pairing identifier, the location information, or a combination thereof, or (b) activating a service, a function, an application, a resource, or a combination thereof of the user device, the transmitter, the communication network, or a combination thereof for use by the user.

15. The apparatus of claim 9, wherein the processor is further configured to:
validate an association between the pairing identifier and the user device;
determine the validation occurs within a predetermined time period; and
providing an error message to the user device when the validation does not occur within the predetermined time period.

16. The apparatus of claim 9, wherein the processor is further configured to:
render a message to the display of the device for requesting the user to scan the label information,
wherein the processing of the label information is based on the scanning and the label information is an optical code, an image, a tag, or a combination thereof.

17. A system comprising:
a platform configured to
receive label information from a user device that is not registered for use by a user over a communication network of a service provider, the label information having been input, at the user device, via an optical label recognition process performed by the device;
process the label information to determine a pairing identifier, assigned by the service provider, to a transmitter, wherein the transmitter is different than the user device and the transmitter includes a short range wireless broadcasting device;
transmit the pairing identifier to the user device;
determine that a pairing connection has been established, based on the pairing identifier, between the user device and the transmitter;
receive location information that identifies a location of the user device or the transmitter; and
initiate a registration procedure of the user device, with the communication network, when the pairing connection was successfully established, the registration procedure being additionally based on the location information.

18. The system of claim 17, wherein the platform is further configured to:
initiate a provisioning procedure of the user device, the transmitter, or a combination thereof with the communication network in response to a fulfillment of the registration procedure,
wherein the provisioning procedure includes (a) updating the pairing identifier, the location information, or a combination thereof, or (b) activating a service, a function, an application, a resource, or a combination thereof of the user device, the transmitter, the communication network, or a combination thereof for use by the user.

19. The method of claim 1, wherein the transmitter includes a Bluetooth low energy transmitter.

20. The apparatus of claim 9, wherein the transmitter includes a Bluetooth low energy transmitter.

* * * * *